United States Patent [19]

Swenson et al.

[11] Patent Number: 5,463,992
[45] Date of Patent: Nov. 7, 1995

[54] ELECTRONIC INTERLOCK FOR MULTIPLE PTO ENABLE SWITCHES

[75] Inventors: Eric T. Swenson, Fort Wayne, Ind.; Riley A. Thomas, III, Oakbrook Terrace, Ill.; Ronald L. Blanchard; Brian P. Marshall, both of Fort Wayne, Ind.

[73] Assignee: Navistar International Transportation Corp., Chicago, Ill.

[21] Appl. No.: 395,370

[22] Filed: Feb. 21, 1995

[51] Int. Cl.$^6$ ................................................. F02B 77/00
[52] U.S. Cl. ................................................. 123/198 R
[58] Field of Search ........................... 123/198 R, 198 D

[56] References Cited

U.S. PATENT DOCUMENTS

| 3,692,007 | 9/1972 | Nilssen | 123/198 R |
| 4,460,056 | 7/1984 | Jaccod | 123/198 R |
| 4,688,530 | 8/1987 | Nishikawa et al. | 123/198 R |

OTHER PUBLICATIONS

"T 444E Product Training" Part Two, Manual No. TMT 2268, Navistar International Transportation Corp. Oct., 1993. pp. 1–21.

"Modern Electronic Circuits Reference Manual" McGraw–Hill, 1980, p. 961.

*Primary Examiner*—Noah P. Kamen
*Attorney, Agent, or Firm*—Dennis K. Sullivan

[57] ABSTRACT

Multiple control-request switches are operatively coupled by an electronic interlock circuit with an electronic engine control that controls an engine that powers a heavy duty automotive vehicle. The vehicle is also equipped with one or more devices, such as an air-compressor or hydraulic pump, that are powered from the engine via a power take-off. The control-request switches request control of this equipment from various stations via control of an operational function of the engine, such as control of engine speed. The interlock circuit functions to allow only a first-to-be-actuated of the control-request switches to acquire control so that subsequent actuation of any other switch causes the control to go to a default mode to avoid conflicting control of the engine and equipment powered through a power take-off.

18 Claims, 2 Drawing Sheets

5,463,992

ELECTRONIC INTERLOCK FOR MULTIPLE PTO ENABLE SWITCHES

FIELD OF THE INVENTION

This invention relates generally to electronic controls for engines and more especially to an electronic interlock circuit for interlocking control-request switches, each of which is capable of enabling an associated control to control an operational function of the engine, such that conflicting control of the operational function is avoided, and/or for interlocking switches, each of which is capable of enabling an associated control to control the operation of one or more various pieces of equipment or machinery powered from the engine via one or more power take-offs, such that conflicting control of the equipment or machinery is avoided.

CROSS-REFERENCE TO RELATED APPLICATION

The inventors' commonly assigned application "Single Switch PTO Enabler", Ser. No. 08/395,391, filed Feb. 21, 1995, is hereby referenced.

BACKGROUND AND SUMMARY OF THE INVENTION

Electronic engine controls comprise electronic circuitry, typically microprocessor based, that processes various inputs to provide the desired engine control functions Usage of electronic engine controls has become commonplace in internal combustion engines that power automotive vehicles.

Certain engine-powered vehicles have one or more PTOs (power take-offs) for allowing equipment or machinery other than the vehicle itself to be operated by the engine, and such vehicles require an associated control for controlling engine operation, engine speed for example, when a PTO is in use operating a piece of equipment If the associated control has multiple control stations, and/or if multiple pieces of equipment are to be controlled, it is desirable to minimize the risk that conflicting inputs from the associated control resulting from human operator error or inadvertence will affect engine and/or equipment operation. Accordingly, it has heretofore been known to provide equipment interlocks using electromechanical relay circuits that give control priority to a request for control from a first-to-be-actuated of multiple control-request switches (These control-request switches may sometimes hereinafter also be referred to as control-enable switches.) If a second-to-be-actuated of the multiple control-request switches requests control before the request from the first-to-be-actuated control-request switch has been withdrawn, the request from the second-to-be-actuated control-request switch will be denied. The same will be true for any other control-request switch so long as the first-to-be-actuated control-request switch retains control.

The present invention relates to a new and useful interlock circuit that prevents associated controls from commanding potentially conflicting operation of an engine and/or of equipment that is powered from the engine through one or more power take-offs. One important advantage of the invention is that fewer relays are used than in the prior relay-type interlock, and this in turn means that wiring complexity is reduced because there are fewer circuits and wiring connections. Reductions of this nature can improve productivity and reliablity. The invention is intended to assist in guarding against human operator error that might otherwise cause potentially conflicting requests to be given to the engine and/or equipment powered from the engine via a PTO.

Briefly, the present invention may in one way generally be described as an interlock circuit that detects actuation of various control-request switches and enables control by the first-to-be-actuated of multiple control-request switches. Subsequent actuation of a second-to-be-actuated control-request switch terminates the enablement of control, which is accompanied by the engine going to a default mode of operation (shut-down or idle are possibilities depending upon how the default is programmed into the engine control) and/or shutting down and locking out equipment powered by the engine.

The invention is further characterized by a unique organization and arrangement of standard electronic circuit components that provide an electronic interlock circuit between the control-request switches and the electronic engine control. The circuit is powered by available electric power, typically 12 VDC.

The foregoing, along with further features, advantages, and benefits of the invention, will be seen in the ensuing description and claims, which are accompanied by drawings. The drawings disclose a presently preferred embodiment of the invention according to the best mode contemplated at this time for carrying out the invention.

DESCRIPTION OF THE PREFERRED EMBODIMENT

Figure 1:
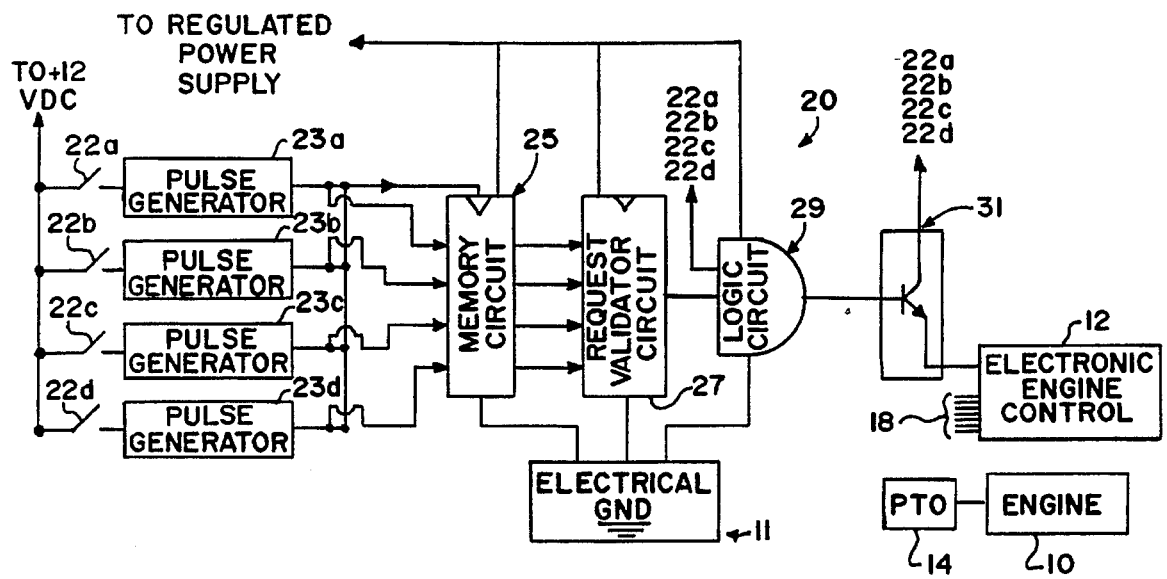
FIG. 1 is a general electrical schematic block diagram of the inventive interlock circuit in association with an engine having an electronic engine control.

FIG. 1 shows an exemplary application of the inventive principles to a vehicle, such as a heavy truck, that comprises an engine 10 that is controlled by an electronic engine control 12. Engine 10 is typically a diesel engine, but broader principles of the invention, as applied to an engine, are not limited to any particular application of the engine or type of engine. Engine 10 operates the vehicle through a powertrain that is not shown in the drawings; however, a PTO 14 is shown in association with engine 10 since the invention relates to certain requirements of engine control 12 for enabling control over equipment (not shown) operated by the engine via PTO 14.

PTO's per se are well known, and PTO 14 is a known commercially available device that has mechanical controls, such as a clutch (not shown) which connects the engine 10 to the PTO for operation.

Engine control 12 receives a number of inputs, shown generally at 18, processes the information received at these inputs, and issues appropriate commands for controlling engine 10. Details of how engine 10 is controlled by control 12 generally do not relate to the principles of the invention, except to the extent that the particular engine control strategy that is shown here by example requires an enabling signal input for enabling control of a particular operational function of the engine that affects the operation of a device (not shown) driven by the PTO 14. In the present example, the particular control strategy requires such an enabling signal input in order to change the engine speed demanded for operating a piece of equipment operatively coupled with engine 12 via PTO 14.

Figure 2:
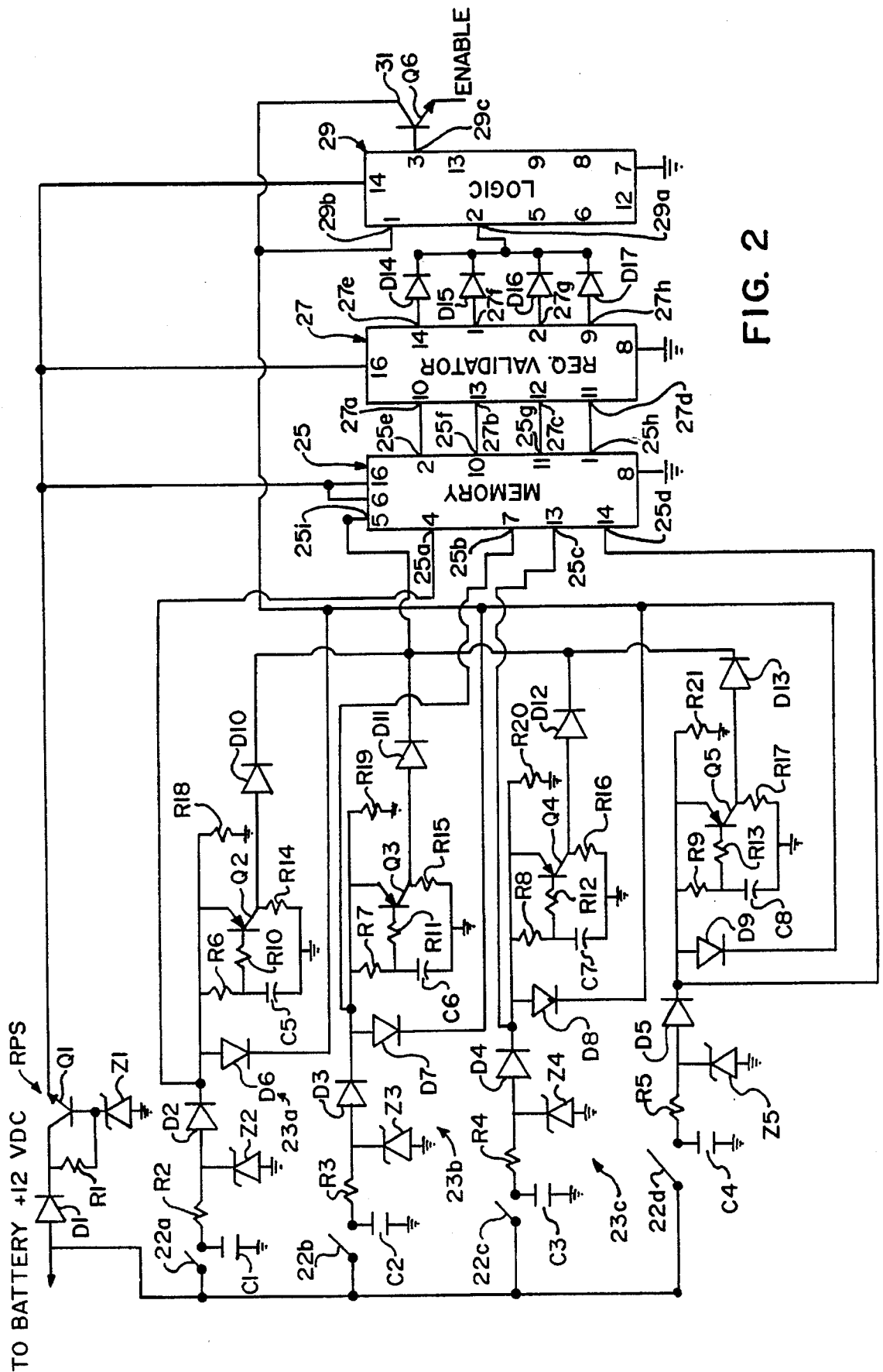
FIG. 2 is a more detailed schematic electric circuit diagram of the interlock circuit.

FIG. 1 further shows the general organization and arrangement of an interlock circuit 20 according to the present invention. Circuit 20 operatively couples multiple engine control-request switches with engine control 12. Four such engine control-request switches are shown by way of example, 22a, 22b, 22c, 22d, and each is selectively actuable to provide, when actuated, a control-request input signal to a respective pulse generator circuit, 23a, 23b, 23c, 23d. Circuit 20 further comprises: a memory circuit 25 having respective inputs connected to respective outputs of the pulse generator circuits; a request validator circuit 27 having respective inputs connected to respective outputs of memory circuit 25; a logic circuit 29 connected to sense actuation of switches 22a, 22b, 22c, 22d and the output of request validator circuit 27; and an enable switch 31 that operatively couples circuit 20 with engine control 12. The existing negative-ground 12-volt DC electric power source of the vehicle supplies electric power for circuit 20. Further detail of circuit 20 is shown in FIG. 2 to which attention is now directed.

Each pulse generator circuit 23a, 23b, 23c, 23d embodies certain aspects of the invention disclosed in the above-referenced patent application "Single Switch PTO Enabler", and further detail may be obtained therefrom. Generally, each pulse generator outputs a momentary switch function in the form of an electrical pulse when the respective switch 22a, 22b, 22c, 22d is actuated. Since each of the pulse generator circuits is identical, only circuit 23a will be described, and it is understood that the description applies to the other three as well even though the drawing shows unique reference signs for the individual circuit components of each pulse generator circuit.

Circuit 23a comprises a timing circuit that acts on the input signal that is given by the operation of switch 22a to closed condition. The timing circuit may be considered to comprise: a series RC circuit composed of a resistor R6 and a capacitor C5 connected in series; a PNP transistor Q2; and resistors R10, R14, R18. Additional components associated with the timing circuit are: diodes D2, D6, D10; a capacitor C1; a resistor R2; and a zener diode Z2.

Resistor R2, zener diode Z2, and diode D2 form a circuit that reduces the voltage that is received from switch 22a when the switch is actuated. The voltage is reduced to a suitable level for the particular memory circuit 25 and logic circuit 29, and the timing circuit components are chosen to also use this reduced voltage for the timing circuit's power supply. The purpose of capacitor C1 is essentially a noise filter, while diode D2 blocks reverse current flow from the timing circuit back toward the zener diode and the switch.

Resistor R6 and capacitor C5 form a series RC circuit. The emitter terminal of transistor Q2 is connected in common with the cathode of diode D2 and terminals of resistors R6, R18, as shown. The transistor's base terminal is connected through resistor R10 in common with the commonly connected terminals of resistor R6 and capacitor C5. The transistor's collector terminal is connected through resistor R14 to ground while the terminal of resistor R18 that is not connected to the transistor's emitter terminal is also connected to ground.

Figure 3A:
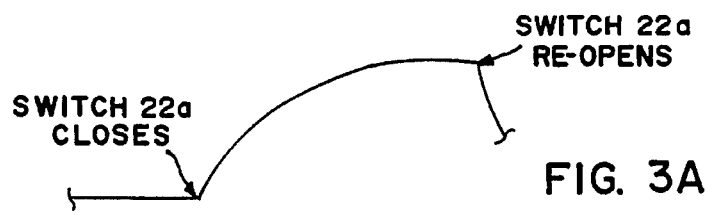
FIGS. 3A and 3B are voltage waveforms useful in understanding the operation of a portion of the circuit shown in FIG. 2.
Figure 3B:
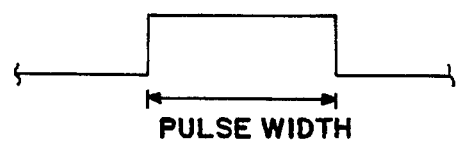

The pulse generator circuit operates in the following manner. With switch 22a open, no voltage is applied to the timing circuit; consequently transistor Q2 cannot be forward biased to a conductive state and so it remains non-conductive. When switch 22a is operated from open to closed, the reduced DC voltage of zener diode Z2 is applied through diode D2. Since capacitor C5 is initially uncharged, closure of switch 22a causes current flow through resistor R2, diode D2, and resistor R6 to begin charging capacitor C5. Concurrent with this action, transistor Q2 becomes forward biased into conduction so that its emitter-collector path carries current through resistor R14. FIG. 3B depicts this switching on a non-dimensional scale, and it is this switching that represents the beginning of an output pulse at the output of pulse generator circuit 23a.

The series RC circuit executes an exponential transient with the voltage across capacitor C5 becoming increasingly positive. This is depicted in FIG. 3A. After a certain portion of the transient has been executed, the base current to transistor Q2 has decreased to a level that is insufficient to maintain conduction through transistor's emitter-collector path and so the transistor switches from conduction back to non-conduction. This represents the termination of the pulse and is also depicted in FIG. 3B.

When switch 22a is re-opened, capacitor C5 begins to discharge through resistors R6, R18. The current flow through resistor R18 reverse biases the base-emitter junction of the transistor so that it is maintained non-conductive. Eventually capacitor C5 is fully discharged so that the circuit assumes its initial condition that existed before switch 22a was first closed.

It is to be noted that switch 22a must remain closed for at least as long as the required pulse width of the output pulse, and in fact the switch can remain closed for an indefinite amount of time thereafter before being reopened. So long as switch 22a remains closed for at least the minimum amount of time required for the pulse width, the total amount of time that switch 22a remains closed is not significant.

Memory circuit 25 is a standard integrated circuit that has multiple input terminals 25a–25d and respective multiple output terminals 25e–25h. It also has a latch command terminal 25i. The circuit is also sometimes referred to as a transparent latch circuit. Memory circuit 25 operates in the following manner. Whenever a latch command signal (in the form of a pulse produced by one of the circuits 23a–23d) is supplied to terminal 25i, an input signal at a respective input terminal 25a–25d is latched in memory and to cause a respective output signal to be given and maintained at the respective output terminal 25e–25h after the latch command signal terminates.

Each respective input terminal 25a–25d is connected to the cathode terminal of the respective diodes D2–D5 such that when the respective switch 22a–22d is operated closed, the reduced positive voltage indicative of switch closure is delivered to the respective terminal 25a–25d. Latch command terminal 25i is connected to the cathodes of all four of diodes D10–D13. Since closure of a respective switch 22a–22d also causes the respective pulse generator circuit 23a–23d to generate a momentary output pulse, a control request from any switch 22a–22d will additionally result in the application of a pulse signal to latch command terminal 25i.

Hence, a first-to-be-actuated of request switches 22a–22d causes an output signal to appear at the respective output terminal 25e–25h of memory circuit 25 while the remaining three output terminals of the memory circuit give no output signal.

Request validator circuit 27 is a standard integrated circuit that has multiple input terminals 27a–27d and multiple output terminals, including the illustrated output terminals 27e–27h. The specific circuit employed in the present embodiment of the invention is a binary-to-decimal decoder circuit in which each of the respective input terminals 27a–27d corresponds to a particular binary digit of a four digit binary number. The circuit also has ten output terminals (four of which are terminals 27e–27h), each of which corresponds to a respective decimal digit (i.e. 0–9). When no signals are present at any of the input terminals 27a–27d (representing the binary number zero), no signals are present at any of the ten output terminals (representing the decimal number zero). Output terminal 27e represents the decimal number one; output terminal 27f, the decimal number two; output terminal 27g represents the decimal number four; and output terminal 27h, the decimal number eight. Accordingly, when the binary number "0001" is present at input terminals 27a–27d, a signal is given at output terminal 27e; when the binary number "0010" is present at input terminals 27a–27d, a signal is given at output terminal 27f; when the binary number "0100" is present at input terminals 27a–27d, a signal is given at output terminal 27g; and when the binary number "1000" is preset at input terminals 27a–27d, a signal is given at output terminal 27h. It is to be noted that each of these four particular numbers comprises only a single "1" binary digit (representing the presence of a signal) while the remaining three binary digits are all "0" (representing the absence of signals). These are the only signal patterns that the request validator circuit will recognize as valid signal patterns.

If a non-zero binary number other than these four particular ones is present at input terminals 27a–27d, then a signal will be given at the corresponding output terminal other than the four terminals 27e–27h. Such other binary number will comprise more than multiple "1's" as its binary digits, and so the output terminals of the request validator circuit that provide respective signals in response to these respective patterns having more than a single "1" as one of its binary digits are not connected in the instant interlock circuit.

Each of the respective output terminals 25e–25h of memory circuit 25 is connected with a respective terminal 27a–27d of request validator circuit 27. The four output terminals 27e–27h are coupled through respective diodes D14, D15, D16, D17 whose cathodes are connected in common. Consequently, a signal will appear at these common cathodes only when a valid signal pattern is present at the inputs of request validator circuit 27.

Logic circuit 29 may be considered essentially as a two-input AND logic gate. The commonly connected cathodes of diodes D14–D17 are connected to one input terminal 29a of logic circuit 29. The cathodes of diodes D6, D7, D8, and D9 are connected in common to the other input terminal 29b. The anodes of the respective diodes D14–D17 are connected to the cathodes of the respective diodes D2–D5 so that when any of the switches 22a–22d is closed, a respective signal will be transmitted to input terminal 29b.

Logic circuit 29 further has an output terminal 29c that gives an output signal when signals are present at both input terminals 29a, 29b. Terminal 29c is connected to the base terminal of an NPN transistor Q6 whose collector terminal is connected to the commonly connected cathodes of diodes D6–D9. The transistor's emitter terminal is connected to the engine control to provide the enable signal as a consequence of any of the valid inputs to circuit 27.

With the foregoing description in mind, the operation of the interlock circuit can now be more fully explained. A first-to-be-actuated of control-request switches 22a–22d will cause a "1" to be latched in memory of memory circuit 25 so that a "1" appears at the respective output terminal. This will create a valid input signal pattern to circuit 27 which validates the request for control that has been made by the first-to-be-actuated of the control-request switches 22a–22d by supplying a validation signal to input terminal 29a of logic circuit 29. That a control request has been made is confirmed by a signal also appearing at the other input terminal 29b of the logic circuit, and so an enabling signal is supplied by output terminal 29c of logic circuit 29. Actuation of a control-request switch also supplies voltage to the collector terminal of transistor Q2 so that transistor Q2 switches to conduction to supply an enable signal to the engine control allowing the control associated with the first-to-be-actuated control-request switch to acquire control.

If any other control-request switch is actuated, while the control associated with the first-to-be-actuated control-request switch continues to have control, an invalid signal pattern will be stored in memory circuit 25 and transmitted to request validator circuit 27. Since an invalid pattern is now presented to circuit 27, the output signal from circuit 27 will appear at other than terminals 27e–27h, and a signal will cease to be supplied to terminal 29a of logic circuit 29. Consequently, the logic circuit will cease to provide sufficient base current for transistor Q6, and the transistor will switch to non-conduction thereby terminating the enable signal to the engine control. The engine control will then be caused to operate to a default mode since conflicting requests for control have been issued. Before a control request can again be validated, all of the control-request switches 22a–22d must be opened.

FIG. 2 shows a regulated power supply RPS that isolates the interlock circuit from the +12 VDC vehicle power supply but obtains power from the vehicle power supply to deliver regulated voltage of suitable magnitude for operating memory circuit 25, request validator circuit 27 and logic circuit 29. While FIG. 2 shows the collector of transistor Q6 connected to receive the reduced voltage when any of the switches 22a–22d is actuated, this is to satisfy particular requirements for the particular engine control. If the engine control enable were to require a +12 VDC signal, then the collector of transistor Q2 could be connected directly to the load side of each of the switches 22a–22d.

While the present disclosure of the inventive principles enables the skilled person to utilize conventional circuit design principles to fabricate different designs for satisfying various timing needs, the following components have been utilized in the disclosed embodiment.

Resistor R1: 470 Ohms, ½ watt
Resistors R2–R5: 1.2 kOhms
Resistors R6–R9: 10 kOhms
Resistors R10–R13: 1.2 kOhms
Resistors R14–R17: 3.3 megohms
Resistors R18–R21: 1.2 kOhms
Diodes D1–D17: 1N4004
Zener Diodes Z1–Z5: 1N4746A
Transistor Q1: TIP 31C
Transistors Q2–Q5: 2N4403
Transistor Q6: 2N2222
    Capacitors C1–C4: 1 microfarad
Capacitors C5–C8: 1 microfarad, 35v ceramic
Memory 25: Motorola MC14042Bd
Request Validator 27: Motorola MC14028Bd
Logic Circuit 29: Motorola MC14081Bd
    Typical uses of the invention are in heavy duty automotive vehicles on which additional power equipment has been installed, including, but not limited to, air compressors, hydraulic pumps, and equipment that can in turn be operated from them, such as cranes, augers, and booms. Where operation of a compressor or pump requires control over engine speed, and where a vehicle has multiple stations that can request such control, the invention helps to guard against human operator error or inadvertence that might otherwise give conflicting speed signals.

While a presently preferred embodiment of the invention has been illustrated and described, it is to be appreciated that the principles may be practiced in other equivalent ways within the scope of the following claims.

What is claimed is:

1. In an internal combustion engine comprising an electronic engine control for controlling various operational functions of the engine, plural control-enabling devices that are individually actuable for enabling one operational function of the engine to occur, and an interlock circuit for operatively coupling said control-enabling devices with said electronic engine control such that when one of said control-enabling devices has been actuated to enable that one operational function to occur, subsequent actuation of any of the remainder of said control-enabling devices terminates the enablement of that one operational function, the improvement in said interlock circuit which comprises:

A) memory circuit means having plural inputs and respective plural outputs and comprising memory for giving and maintaining an output signal at a respective output whenever an input signal is received at the respective input;

B) plural input circuits respectively operatively coupling respective ones of said control-enabling devices with respective ones of said inputs of said memory circuit means for providing respective input signals to respective ones of said inputs;

C) validation circuit means having plural inputs and an output means and comprising means for giving a validation signal at said output means only in response to any one of plural valid combinations of input signals to said validation circuit means' inputs;

D) plural coupling circuits respectively operatively coupling respective outputs of said memory circuit means with respective inputs of said validation circuit means for supplying respective output signals of said memory circuit means to respective inputs of said validation circuit means;

E) said validation circuit means comprising means for giving a validation signal at its output means in response to a first-to-be-actuated of said control-enabling devices and means for terminating the validation signal in response to a second-to-be-actuated of said control-enabling devices; and F) means operatively coupling said output means of said validation circuit means with said electronic engine control for enabling that one operational function of the engine to occur when the validation signal is given and for terminating the enablement of that one operational function when the validation signal is terminated.

2. The improvement set forth in claim 1 wherein said validation circuit means comprises a binary-to-decimal converter circuit;

said inputs of said validation circuit means comprise individual input terminals of said binary-to-decimal converter circuit, each of which input terminals is operatively connected with a respective output of said memory circuit means and corresponds to a particular binary digit of a binary number;

said output means of said validation circuit means comprises individual output terminals of said binary-to-decimal converter circuit, each of which output terminals corresponds to a particular decimal digit; and said means operatively coupling said output means of said validation circuit means with said electronic engine control comprises connections only with those output terminals of said binary-to-decimal converter circuit that correspond to valid combinations of input signals to said input terminals of said binary-to-decimal converter circuit.

3. The improvement set forth in claim 2 wherein said means operatively coupling said output means of said validation circuit means with said electronic engine control further comprises logic circuit means having input means and output means;

said connections only with those output terminals of said binary-to-decimal converter circuit that correspond to valid combinations of input signals to said input terminals of said binary-to-decimal converter circuit comprise connections to said input means of said logic circuit means;

by-pass circuit means by-passing said memory circuit means and said validation circuit means for operatively coupling said input circuits directly with said input means of said logic circuit means;

means operatively coupling said output means of said logic circuit means with said electronic engine control; and said logic circuit means comprises means for passing the validation signal to said electronic engine control via said logic circuit means' output means provided that said by-pass circuit means confirms to said logic circuit means directly from a respective one of said input circuits, the actuation of the respective control-enabling device.

4. The improvement set forth in claim 3 wherein said input means of said logic circuit means comprises two input terminals;

said connections only with those output terminals of said binary-to-decimal converter circuit that correspond to valid combinations of input signals to said input terminals of said binary-to-decimal converter circuit comprise in the connections of those output terminals of said binary-to-decimal converter circuit to said input means of said logic circuit means, respective diodes to one of said two input terminals of said logic circuit means; and said by-pass circuit means comprises respective diodes coupling respective input circuits to the other of said two input terminals of said logic circuit means.

5. The improvement set forth in claim 4 wherein said output means of said logic circuit means comprises an output terminal via which the validation signal is passed;

said means operatively coupling said output means of said logic circuit means with said electronic engine control comprises an electronic switch having a principal conduction path and a control input for rendering said principal conduction path selectively operable to a first conductivity condition and to a second conductivity condition different from such first conductivity condition;

means operatively connecting said control input with said output terminal of said logic circuit means to place said electronic switch under the control of said logic circuit means;

said principal conduction path of said electronic switch comprises two terminals;

means operatively connecting one of said two terminals of said principal conduction path with said by-pass circuit means such that said respective diodes of said by-pass circuit means couple the respective input circuits with said one of said two terminals of said principal conduction path;

and means operatively connecting the other of said two terminals of said principal conduction path with said electronic engine control.

6. The improvement set forth in claim 1 wherein said memory circuit means comprises a latch command terminal for receiving a momentary latch command signal and means for causing any input signal that is present at the respective input of said memory circuit means at the time of such momentary latch command signal to be latched in the memory of said memory circuit means and said memory circuit means to give and maintain an output signal at the respective output of said memory circuit means;

each of said control-enabling devices comprises a respective request switch that is selectively operable to first and second switch conditions and when in the second switch condition provides a respective input signal to a respective input of said memory circuit means;

each of said input circuits further comprises a respective timing circuit for giving a momentary latch command signal when the respective request switch is operated to and maintained in the second switch condition; and means operatively connecting said timing circuits with said latch command terminal of said memory circuit means for supplying a momentary latch command signal from any respective one of said input circuits to said latch command terminal to cause an input signal present at the respective input of said memory circuit means to be given and maintained at the respective output of said memory circuit means.

7. The improvement set forth in claim 1 wherein said means operatively coupling said output means of said validation circuit means with said electronic engine control further comprises logic circuit means having input means and output means;

further including a by-pass circuit means that by-passes said memory circuit means and said validation circuit means for operatively coupling said input circuits directly with said input means of said logic circuit means;

means operatively coupling said output means of said logic circuit means with said electronic engine control; and said logic circuit means comprises means for passing the validation signal to said electronic engine control via said logic circuit means' output means provided that said by-pass circuit means confirms to said logic circuit means directly from one of said input circuits, the actuation of the respective control-enabling device.

8. The improvement set forth in claim 1 wherein said electronic engine control comprises means for controlling engine speed as one of said operational functions, and said interlock circuit provides for enablement of control of engine speed from a first-to-be-actuated of said control-enabling devices by enabling control when only the first-to-be-actuated of said control-enabling devices is actuated to give a respective input signal to the respective input of said memory circuit means and by terminating the enablement of control when a second-to-be-actuated of said control-enabling devices is actuated to cause said memory means to give an output signal at more than one of its outputs.

9. In an internal combustion engine comprising an electronic engine control for controlling various operational functions of the engine, plural request switches that are individually actuable for enabling one operational function of the engine to occur, and an interlock circuit for operatively coupling said request switches with said electronic engine control such that when one of said request switches has been actuated to enable that one operational function to occur, subsequent actuation of any of the remainder of said request switches terminates the enablement of that one operational function, the improvement in said interlock circuit which comprises:

A) request-switch-actuation-detection circuit means having inputs and outputs and comprising means for detecting actuation of each of said request switches and for providing at a respective output a respective output signal representing actuation of the respective request switch;

B) plural coupling circuits respectively operatively coupling respective ones of said request switches with respective inputs of said request-switch-actuation-detection circuit means for supplying respective input signals to respective inputs of said request-switch-actuation-detection circuit means;

C) validation circuit means comprising a binary-to-decimal converter circuit means that comprises individual inputs, each of which inputs is operatively connected with a respective output of said request-switch-actuation-detection circuit means and corresponds to a particular binary digit of a binary number;

D) said binary-to-decimal converter circuit means further comprising individual outputs each of which corresponds to a particular decimal number; and E) means operatively coupling said electronic engine control only with certain outputs of said binary-to-decimal converter circuit means for enabling the one operational function to occur only when a valid input signal pattern is present at said inputs of said binary-to-decimal converter circuit;

F) each respective valid input signal pattern causing a respective validation signal to appear only at a single respective one of said certain outputs of said binary-to-decimal converter circuit means.

10. The improvement set forth in claim 9 wherein said binary-to-decimal converter circuit means comprises means for terminating the enablement of that one operational function when a valid input signal pattern appears at more than one of said certain outputs.

11. An interlock circuit for operatively coupling plural control-enabling devices that are individually actuable for causing the interlock circuit to give an enabling signal when one of said control-enabling devices has been actuated and to terminate the enabling signal upon subsequent actuation of any of the remainder of said control-enabling devices, said interlock circuit comprising in combination with said control-enabling devices:

A) memory circuit means having plural inputs and respective plural outputs and comprising memory for giving and maintaining an output signal at a respective output whenever an input signal is received at the respective input;

B) plural input circuits respectively operatively coupling respective ones of said control devices with respective ones of said inputs of said memory circuit means for providing respective input signals to respective ones of said inputs;

c) validation circuit means having plural inputs and an output means and comprising means for giving a validation signal at said output means only in response to any one of plural valid combinations of input signals to said validation circuit means' inputs;

D) plural coupling circuits respectively operatively coupling respective outputs of said memory circuit means with respective inputs of said validation circuit means for supplying respective output signals of said memory circuit means to respective inputs of said validation circuit means;

E) said validation circuit means comprising means for giving a validation signal at its output means in response to a first-to-be-actuated of said control-enabling devices and means for terminating the validation signal in response to a second-to-be-actuated of said control-enabling devices; and F) means operatively coupled with said output means of said validation circuit means for giving the enabling signal when the validation signal is given and for terminating the enabling signal when the validation signal is terminated.

12. An interlock circuit as set forth in claim 11 wherein said validation circuit means comprises a binary-to-decimal converter circuit;

said inputs of said validation circuit means comprise individual input terminals of said binary-to-decimal converter circuit, each of which input terminals is operatively connected with a respective output of said memory circuit means and corresponds to a particular binary digit of a binary number;

said output means of said validation circuit means comprises individual output terminals of said binary-to-decimal converter circuit, each of which output terminals corresponds to a particular decimal digit; and said means operatively coupled with said output means of said validation circuit means comprises connections only with those output terminals of said binary-to-decimal converter circuit that correspond to valid combinations of input signals to said input terminals of said binary-to-decimal converter circuit.

13. An interlock circuit as set forth in claim 12 wherein said means operatively coupled with said output means of said validation circuit means further comprises logic circuit means having input means and output means;

said connections only with those output terminals of said binary-to-decimal converter circuit that correspond to valid combinations of input signals to said input terminals of said binary-to-decimal converter circuit comprise connections to said input means of said logic circuit means;

by-pass circuit means by-passing said memory circuit means and said validation circuit means for operatively coupling said input circuits directly with said input means of said logic circuit means; and said logic circuit means comprises means for passing the validation signal to said logic circuit means' output means to give the enabling signal at said logic circuit means' output means, provided that said by-pass circuit means confirms to said logic circuit means directly from a respective one of said input circuits, the actuation of the respective control-enabling device.

14. An interlock circuit as set forth in claim 13 wherein said input means of said logic circuit means comprises two input terminals;

said connections only with those output terminals of said binary-to-decimal converter circuit that correspond to valid combinations of input signals to said input terminals of said binary-to-decimal converter circuit comprise in the connections of those output terminals of said binary-to-decimal converter circuit to said input means of said logic circuit means, respective diodes to one of said two input terminals of said logic circuit means; and said by-pass circuit means comprises respective diodes coupling respective input circuits to the other of said two input terminals of said logic circuit means.

15. An interlock circuit as set forth in claim 14 wherein said output means of said logic circuit means comprises an output terminal via which the enabling signal is given;

further including an electronic switch having a principal conduction path and a control input for rendering said principal conduction path selectively operable to a first conductivity condition and to a second conductivity condition different from such first conductivity condition;

means operatively connecting said control input with said output terminal of said logic circuit means to place said electronic switch under the control of said logic circuit means;

said principal conduction path of said electronic switch comprises two terminals; and means operatively connecting one of said two terminals of said principal conduction path with said by-pass circuit means such that said respective diodes of said by-pass circuit means couple the respective input circuits with said one of said two terminals of said principal conduction path.

16. An interlock circuit as set forth in claim 11 wherein said memory circuit means comprises a latch command terminal for receiving a momentary latch command signal and means for causing any input signal that is present at the respective input of said memory circuit means at the time of such momentary latch command signal to be latched in the memory of said memory circuit means and said memory circuit means to give and maintain an output signal at the respective output of said memory circuit means;

each of said control-enabling devices comprises a respective request switch that is selectively operable to first and second switch conditions and when in the second switch condition provides a respective input signal to a respective input of said memory circuit means;

each of said input circuits further comprises a respective timing circuit for giving a momentary latch command signal when the respective request switch is operated to and maintained in the second switch condition; and means operatively connecting said timing circuits with said latch command terminal of said memory circuit means for supplying a momentary latch command signal from any respective one of said input circuits to said latch command terminal to cause an input signal present at the respective input of said memory circuit means to be given and maintained at the respective output of said memory circuit means.

17. An interlock circuit as set forth in claim 11 wherein said means operatively coupled with said output means of said validation circuit means further comprises logic circuit means having input means and output means;
further including a by-pass circuit means that by-passes said memory circuit means and said validation circuit means for operatively coupling said input circuits directly with said input means of said logic circuit means; and
said logic circuit means comprises means for passing the validation signal to said logic circuit means' output means to give the enabling signal at said logic circuit means' output means, provided that said by-pass circuit means confirms to said logic circuit means directly from one of said input circuits, the actuation of the respective control-enabling device.

18. An interlock circuit as set forth in claim 11 wherein said control-enabling devices are switches.

\* \* \* \* \*